United States Patent
Thomas et al.

(10) Patent No.: US 7,453,392 B2
(45) Date of Patent: Nov. 18, 2008

(54) METHODS AND SYSTEMS UTILIZING DOPPLER PREDICTION TO ENABLE FUSING

(75) Inventors: Steven H. Thomas, Brooklyn Center, MN (US); Timothy J. Reilly, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/025,907

(22) Filed: Feb. 5, 2008

(65) Prior Publication Data

US 2008/0122677 A1    May 29, 2008

Related U.S. Application Data

(62) Division of application No. 11/330,027, filed on Jan. 11, 2006, now Pat. No. 7,352,319.

(60) Provisional application No. 60/689,369, filed on Jun. 10, 2005.

(51) Int. Cl.
*G01S 13/88* (2006.01)
*F42C 13/04* (2006.01)

(52) U.S. Cl. .................... 342/68; 342/166; 342/110; 102/214; 89/6.5

(58) Field of Classification Search ............... 342/68
See application file for complete search history.

(56) References Cited

U.S. PATENT DOCUMENTS

| | | | |
|---|---|---|---|
| 3,327,631 A | 6/1967 | Howard et al. | |
| 3,332,077 A | 7/1967 | Nard et al. | |
| 3,858,207 A | 12/1974 | Macomber et al. | |
| 4,089,000 A * | 5/1978 | Bradford | 342/68 |
| 4,118,702 A * | 10/1978 | Rabinow | 342/68 |
| 4,119,039 A | 10/1978 | Wilkins et al. | |
| 4,158,842 A | 6/1979 | Clemens et al. | |
| 4,159,476 A * | 6/1979 | Kohler | 102/214 |
| 4,236,157 A * | 11/1980 | Goss et al. | 342/68 |
| 4,267,776 A | 5/1981 | Eickerman | |
| 4,599,616 A | 7/1986 | Barbella et al. | |
| 4,656,480 A | 4/1987 | Allezard et al. | |
| 5,426,435 A | 6/1995 | Moore et al. | |
| 5,539,410 A * | 7/1996 | Zveglich | 342/68 |
| 5,574,462 A | 11/1996 | Schmucker et al. | |
| 5,617,097 A * | 4/1997 | Gavnoudias | 342/68 |
| 5,644,099 A | 7/1997 | Rabbow et al. | |
| 5,696,347 A | 12/1997 | Sebeny, Jr. et al. | |

(Continued)

*Primary Examiner*—Thomas G. Black
*Assistant Examiner*—Shelley Chen
(74) *Attorney, Agent, or Firm*—Fogg & Powers LLC

(57) ABSTRACT

A radar processor for controlling detonation of a munition and operable to receive a detonation altitude from an external source is provided. The radar processor is configured to set a first range gate and a reference range gate based on the received detonation altitude, and cause a radar transmitter to operate in a continuous wave mode, for a predetermined period, upon receipt of radar return signals through the first range gate. The radar processor calculates a velocity of the munition from continuous wave return signals, and calculates a time delay for outputting a detonation signal based on the received detonation altitude, the calculated velocity, and a reference altitude of the munition, the altitude of the munition calculated based upon receipt of radar return signals through the reference range gate. The radar transmitter operates in a pulse mode while the munition is outside the reference range gate.

6 Claims, 2 Drawing Sheets

U.S. PATENT DOCUMENTS

| | | |
|---|---|---|
| 5,936,233 A | 8/1999 | Nunnally |
| 6,216,595 B1 | 4/2001 | Lamorlette et al. |
| 6,389,974 B1 | 5/2002 | Foster |
| 6,834,591 B2 * | 12/2004 | Rawcliffe et al. ........... 102/214 |
| 7,098,841 B2 * | 8/2006 | Hager et al. ................. 342/68 |
| 2002/0144619 A1 * | 10/2002 | Rawcliffe et al. ........... 102/214 |
| 2005/0188826 A1 | 9/2005 | McKendree et al. |
| 2006/0087472 A1 * | 4/2006 | Troutman et al. ............. 342/68 |
| 2006/0103570 A1 * | 5/2006 | Hager et al. ................. 342/68 |
| 2006/0279452 A1 * | 12/2006 | Thomas et al. ............... 342/68 |
| 2007/0085727 A1 * | 4/2007 | Backes et al. ................ 342/68 |

* cited by examiner

METHODS AND SYSTEMS UTILIZING DOPPLER PREDICTION TO ENABLE FUSING

CROSS REFERENCE TO RELATED APPLICATIONS

This application is a divisional of U.S. patent application Ser. No. 11/330,027 (U.S. Pat. No. 7,352,319), filed Jan. 11, 2006 and entitled "METHODS AND SYSTEMS UTILIZING DOPPLER PREDICTION TO ENABLE FUSING" (the '027 Application). The '027 Application is incorporated herein by reference.

This application claims the benefit of priority to U.S. provisional application No. 60/689,369 filed Jun. 10, 2005, the disclosure of which is incorporated herein by reference.

BACKGROUND

This invention relates generally to radar systems, and more particularly to methods and systems that utilize Doppler prediction to set a height of fusing, for example, for a radar based weapon system.

A radar based weapon system is configured to fuse the weapon of the system at various low altitudes so that the weapon will have optimum impact. A dual antenna (i.e. one transmit antenna and one receive antenna) radar system installation within the weapon system that has sufficient separation between the two antennas is not practical for smaller weapon systems. One reason separation between the antennas is important is to reduce an antenna leakage signal that propagates between the two antennas. Sufficient antenna separation to measure elevations near or at ground level such that antenna leakage signals do not interfere with altitude measurements typically cannot be efficiently incorporated into smaller weapon systems. In these smaller weapon systems there is simply not enough room to adequately separate the two antennas.

In smaller weapons systems that incorporate two antennas, the two antenna apertures are typically located near one another, significantly increasing the antenna leakage signal. Therefore, with a dual antenna weapon system it is difficult to accurately measure certain low altitudes because the antenna leakage signals interfere with time coincident ground return signals.

A single antenna installation using a duplexer is even more difficult to implement in smaller weapons. The reason is that one antenna systems do not even exhibit some of the inherent antenna leakage isolation found in the dual antenna systems. Rather, signals similar to leakage signals are internal to the radar. As a result, it is also difficult for a one antenna radar sensor on a small weapon system to measure altitudes near or at ground level.

SUMMARY

In one aspect, a radar processor for controlling detonation of a munition is provided which is configured to receive a detonation altitude from an external source. The radar processor is configured to set a first range gate and a reference range gate based on the received detonation altitude, and cause a radar transmitter to operate in a continuous wave mode, for a predetermined period, upon receipt of radar return signals through the first range gate. The radar processor calculates a velocity of the munition from continuous wave return signals, and calculates a time delay for outputting a detonation signal based on the received detonation altitude, the calculated velocity, and a reference altitude of the munition, the altitude of the munition calculated based upon receipt of radar return signals through the reference range gate. The radar transmitter operates in a pulse mode while the munition is outside the reference range gate.

DRAWINGS

DETAILED DESCRIPTION

The methods and systems described herein provide a solution for weapon system fusing at low altitudes by measuring a precision reference altitude where antenna leakage interference is not present and measuring the velocity of the vehicle as it approaches the ground. Once velocity of the munition is determined, the munition continues toward the ground until it encounters a ground return that is time coincident with a preset reference altitude gate, establishing the precision reference altitude. From these two measurements, a time delay can be used to accurately predict when the weapon system will attain an altitude at or near ground level, and a timing sequence is started. As a result, antenna leakage signals do not interfere with the operation of the sensor.

Figure 1:
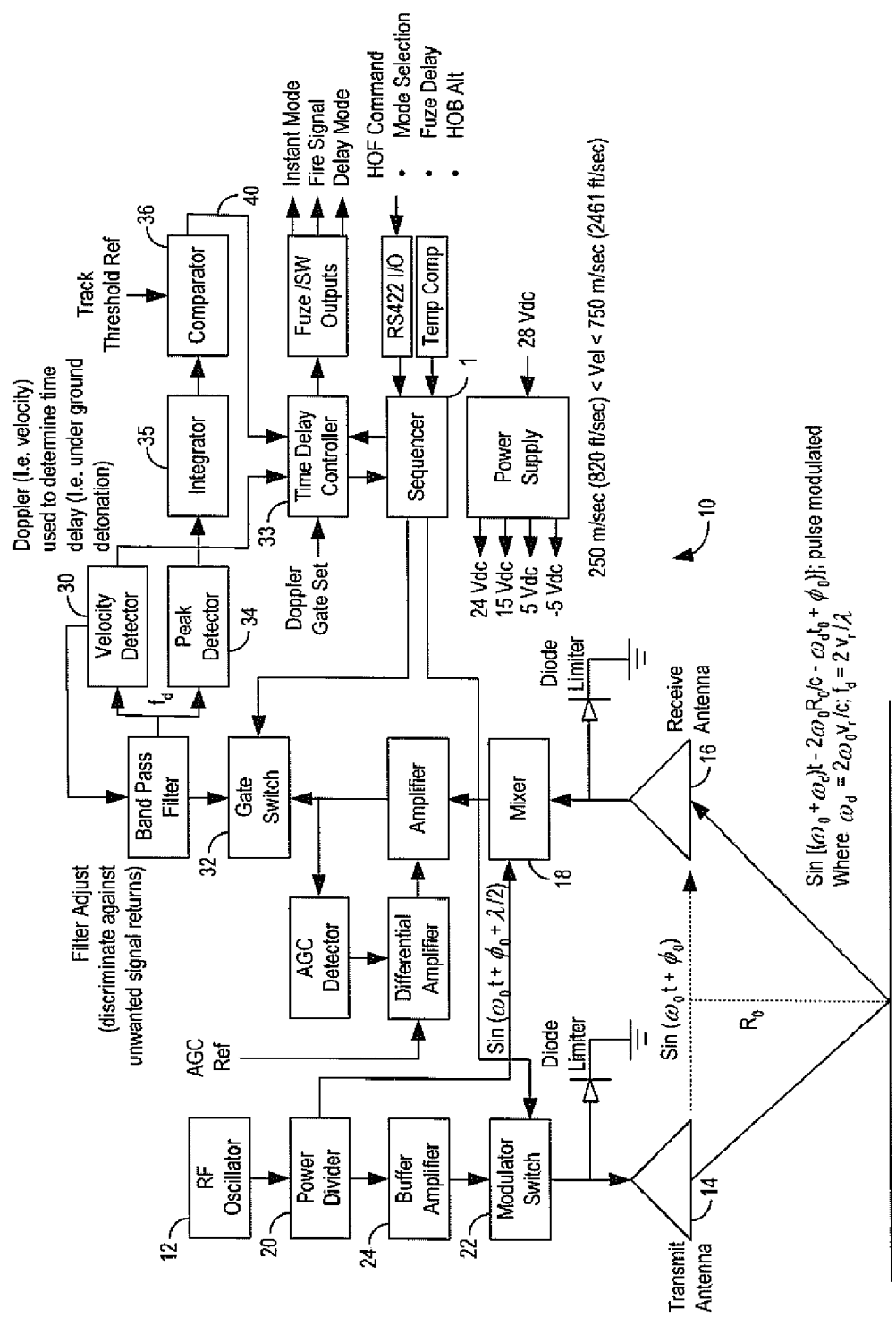
FIG. 1 is a block diagram of a radar system for fusing weapon systems at or near ground level altitudes.

A programmable sequencer provides the capability to program a desired detonation altitude, which is sometimes referred to as a height of fuse (HOF), prior to launch. FIG. 1 is a block diagram of a radar based fusing system 10 incorporating such a sequencer. Referring specifically to FIG. 1, an RF oscillator 12 provides the frequency source for transmission through transmit antenna 14 and for down conversion of the radar return pulse received at receive antenna 16. The frequency is down converted at mixer 18 and the frequency from RF oscillator 12 is provided to mixer 18 through power divider 20. Modulation switch 22 provides pulse modulation of the signals to be transmitted. A buffer amplifier 24 provides isolation for RF oscillator 12 from the impedance variations caused by modulation switch 22 to reduce oscillator frequency pulling during transmission to a tolerable level, keeping the return frequency within a pass band of the receiver portion of system 10.

Figure 2:
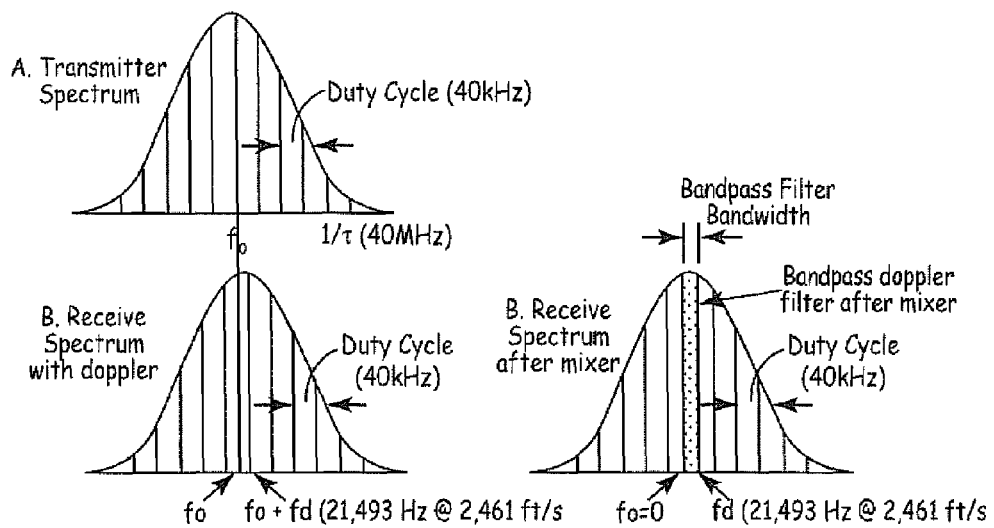
FIG. 2 is an illustration of transmit and receive spectrums for the system of FIG. 1.

The down converted radar return frequency output by mixer 18 is at a Doppler shift proportional to the downward velocity of the vehicle and is sometimes referred to as the Doppler frequency. The Doppler frequency, $f_d$, is equal to 2×velocity/wavelength. In one embodiment, the transmitter frequency ($f_o$) is at 4.3 GHz and therefore, the wavelength is $c/f_o$, where c is the speed of light. For example, at a velocity of 2461 Ft/sec (i.e. 750 m/sec), and 4.3 GHz oscillator frequency (i.e. wavelength of 0.229 feet), the Doppler shift is $f_d$=2×2461/0.229, or 21,493 Hz at an output of the mixer 18 as illustrated in FIG. 2. Since the trajectory could be 10° from Nadir, then the maximum closing velocity would be 738 m/sec and the resulting Doppler frequency would be 21,149 Hz.

The low end of the Doppler bandwidth is determined when the velocity of the vehicle is at its minimum, for example, 820 ft/sec (i.e. 250 m/sec), which results in a Doppler frequency of 7,161 Hz. Again, with trajectory angle of 10°, the minimum closing velocity would be 246 and the minimum Doppler frequency is 7,046 Hz. The maximum Doppler bandwidth is therefore 21,493-7,046=14,447 Hz.

Referring back to FIG. 1, system 10 includes a velocity detector 30. A Doppler gate 32 is set at a higher altitude (i.e. the first altitude) and the Doppler frequency is measured. This Doppler frequency is used by velocity detector 30 to calculate the velocity. For low altitudes or penetration detection, a time delay can be calculated by time delay controller 33, based on the velocity along with knowing when the munition is at the reference altitude, and then used to accurately generate the height of fuse (HOF) signal at the desired detonation altitude.

Also, the Doppler frequency signal is peak detected with peak detector 34, integrated at integrator 35, and threshold detected at comparator 36 so that when the ground return signal passes through Doppler gate 32, at a time coincident with a reference HOF gate, then a fusing signal 40 can be generated. Doppler gate 32 can be pre-set with a reference HOF gate at any time that is consistent with a position within the fusing range of the weapon to be detonated.

Figure 3:
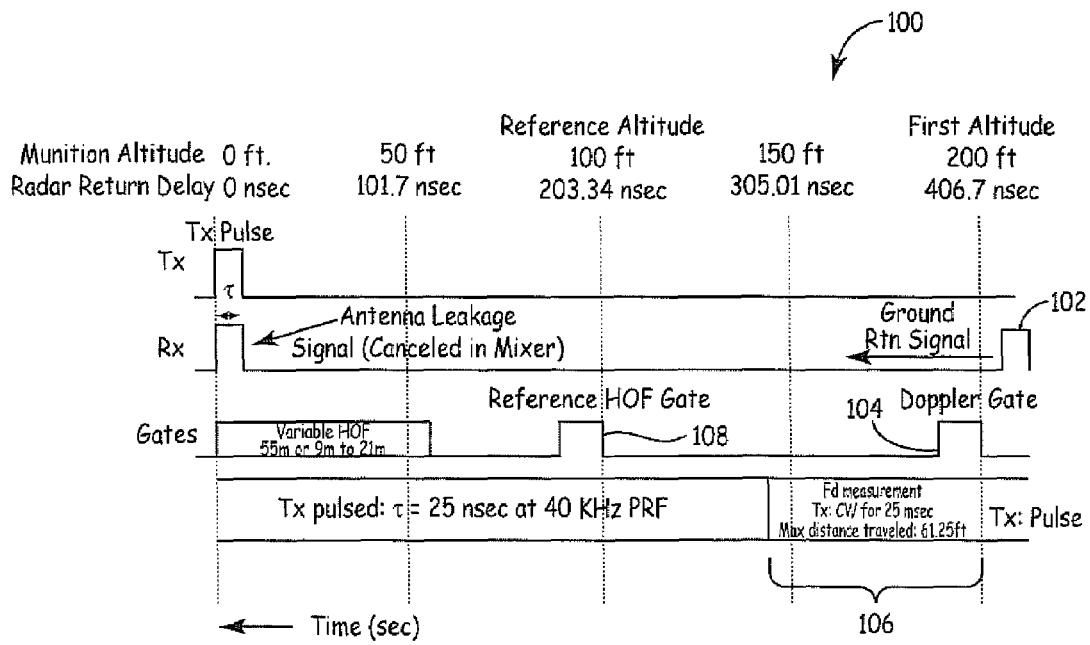
FIG. 3 is an illustration of timing signals present in the system of FIG. 1.

FIG. 3 is a timing diagram 100 illustrating a sequence of events which occurs within system 10 (shown in FIG. 1) after launch of such a system. For example, if the vehicle is at an altitude of greater than 200 feet (i.e. a radar ground return time of 406.7 ns), the transmitter of system 10 is operating in a pulse mode. When operating in the pulse mode, the pulse width is narrow, for example, about 25 nanoseconds, and at a pulse repetition frequency (PRF) of about 40 KHz. This PRF is about twice the maximum Doppler frequency. The ground return pulse 102 is received at receive antenna 16 (shown in FIG. 1) in excess of 406.7 nanoseconds from the time of transmission.

As the vehicle continues toward the ground, the ground return signal will become coincident with a programmed ground pulse return time within Doppler gate 32 (shown in FIG. 1), and illustrated in FIG. 3 as Doppler gate pulse 104. When the ground return pulse occurs 102 within the gated time (i.e., during the Doppler gate pulse 104), the transmitter of system 10 is configured to revert from a gated or pulsed transmission to a continuous wave (CW) transmission for about 25 milliseconds, shown in FIG. 3 as 106. During this time, the Doppler frequency based on the CW transmission is accurately measured within system 10.

At a minimum velocity (i.e. about 250 meters/sec) of the vehicle (e.g., weapon), the Doppler frequency is about 7 KHz, as described above. During the 25 millisecond period, 176 cycles will be sampled with a distribution error of about 0.56% or about 4.6 ft/sec. The distance traveled by the vehicle at this velocity and time is 20.5 feet. At a maximum velocity of the vehicle (i.e. 750 meters/sec), the Doppler frequency is about 21.5 KHz. During the 25 millisecond period of CW transmission, 537 cycles will be sampled with a distribution error of 0.186% or 4.6 ft/sec. The distance traveled by the vehicle at this velocity and time is 61.25 feet. At the end of the 25 milliseconds, the Doppler frequency will be measured and the transmitter will revert back to the pulse mode.

As the vehicle continues toward the ground, the return signal will eventually be coincident with a reference altitude HOF gate 108 that has been programmed into system 10, for example, programmed into Doppler gate 32. Reference altitude HOF gate 108 is precisely placed in time, for example, at 203.34 nanoseconds after transmission of a radar pulse, which is representative of the return time for a radar pulse from a vehicle at about 100 feet in altitude. By knowing the precise reference altitude of the vehicle, based on a ground return pulse being received when HOF gate 108 is active, and the velocity of the vehicle relative to the ground based on the Doppler measurement during the CW transmission, then delays, for example, using time delay controller 50 (shown in FIG. 1) can be established. The delay is the time that it will take the vehicle to travel from the altitude that is coincident with the reference altitude HOF gate 108 to the desired detonation altitude, based on the vehicle velocity. Programming of such a delay results in generation of a fusing signal which occurs at the programmed detonation altitude setting (i.e. between 0 and 25 meters).

With an upper cutoff frequency of the Doppler frequency of 21,493 Hz, the pulse repetition frequency (PRF) should be set at about two times the Doppler frequency or about 40 KHz. This PRF will result in a first spectral line that is comfortably outside the Doppler bandwidth. If the transmitter pulse width is 25 nanoseconds, then the duty cycle is only 0.1%. With a low duty cycle, the gated system should provide additional jam immunity.

The above described gating and ground return signal processing configuration allows reliable operation, for example programmable detonation altitudes, down to zero feet altitude with a much lower antenna spacing than in previous systems. If there is no motion of the vehicle (munition), the output of the mixer will be 0 Hz (DC). This is the case for antenna leakage interference. Varying the phase of the local oscillator signal of mixer 18 signal results in the DC level of the antenna leakage signal varying. The DC level is set to zero by fixing the line length from power divider 20 to mixer 18 to provide a 180 degree shift with respect to the antenna to antenna leakage path length.

The above described system satisfies the need for a height of fuse (HOF) radar system for small munitions that operates at selected altitudes near and at ground level. Both pulse gating and Doppler frequency measurements are used to provide fusing of the munition at accurate altitudes. Fusing can be obtained down to zero feet with much closer antenna spacing or even with a single antenna by using coherent processing, Doppler isolation, and Doppler velocity prediction by avoiding altitude measurements that may be coincident with the receiving of an antenna leakage signal. The result is a low cost and small size sensor through incorporation of a single-frequency-oscillator design which provides both the transmit source and receiver down conversion source. A small, low cost, and low transmitter power is achievable through the incorporation of the signal oscillator, radar receiver processing technique, which takes advantage of the positive ground return Doppler shift associated with the downward motion.

While the invention has been described in terms of various specific embodiments, those skilled in the art will recognize that the invention can be practiced with modification within the spirit and scope of the claims.

What is claimed is:

1. A radar processor for controlling detonation of a munition and operable to receive a detonation altitude from an external source, the radar processor configured to:
   set a first range gate and a reference range gate based on the received detonation altitude;
   cause a radar transmitter to operate in a continuous wave mode, for a predetermined period, upon receipt of radar return signals through the first range gate;
   calculate a velocity of the munition from continuous wave return signals;
   calculate a time delay for outputting a detonation signal based on the received detonation altitude, the calculated velocity, and a reference altitude of the munition, the altitude of the munition calculated based upon receipt of radar return signals through the reference range gate; and wherein the radar processor is configured to cause the radar transmitter to operate in a pulse mode while the munition is outside the reference range gate.

2. The radar processor of claim 1, wherein to calculate a velocity, the radar processor comprises a velocity detector configured to determine a velocity of the munition using a Doppler frequency included in the continuous wave return signals.

3. The radar processor of claim 1, further comprising a peak detector configured to generate a fusing signal when a radar return signal is time coincident with the reference range gate.

4. The radar processor of claim 3, further comprising a time delay controller configured to receive a fusing signal originating from the peak detector and output a detonation signal that is time delayed from the fusing signal.

5. The radar processor of claim 3, further comprising an integrator and a comparator, the fusing signal from the peak detector integrated by the integrator and threshold detected by the comparator.

6. The radar processor of claim 1, further comprising a band pass filter configured to pass radar return signals having a Doppler frequency bandwidth based on the velocity of the munition.

* * * * *